(12) United States Patent
Kini et al.

(10) Patent No.: US 8,902,766 B2
(45) Date of Patent: Dec. 2, 2014

(54) METHOD AND APPARATUS TO IMPROVE LDP CONVERGENCE USING HIERARCHICAL LABEL STACKING

(75) Inventors: Sriganesh Kini, Fremont, CA (US); Pramodh D'Souza, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 726 days.

(21) Appl. No.: 12/886,439

(22) Filed: Sep. 20, 2010

(65) Prior Publication Data

US 2012/0069745 A1 Mar. 22, 2012

(51) Int. Cl.
*H04J 3/14* (2006.01)
*H04L 12/26* (2006.01)
*H04L 12/707* (2013.01)
*H04L 12/703* (2013.01)
*H04L 12/723* (2013.01)

(52) U.S. Cl.
CPC ............... *H04L 45/28* (2013.01); *H04L 45/22* (2013.01); *H04L 45/50* (2013.01)
USPC ........................... 370/252; 370/282; 370/388

(58) Field of Classification Search
USPC ....................................................... 370/252
See application file for complete search history.

(56) References Cited

U.S. PATENT DOCUMENTS 7,936,780 B1 * 5/2011 Kompella ..................... 370/466
2003/0043792 A1 * 3/2003 Carpini et al. ................ 370/386

OTHER PUBLICATIONS

Cisco Systems, "Introduction to Intermediate System to Intermediate System Protocol." (May 8, 2006 http://web.archive.org/web/20060508082506/http://www.cisco.com/en/US/tech/tk365/technologies_white_paper09186a00800a3e6f.shtml) PDF Attached ("Cisco NPL").*
Jeff Doyle, "Understanding MPLS Explicit and Implicit Null Labels." (Jan. 19, 2008, http://www.networkworld.com/community/node/24143).*
Andersson et al. "LDP Specification" (RFC 5036, Oct. 2007, http://www.ietf.org/rfc/rfc5036.txt) PDF Attached ("RFC 5036").*
B. Thomas et al, LDP Capabilities, Network Working Group, Request for Comments: 5561, Jul. 2009, 13 pages.
K. Kompella et al, IS-IS Extensions in Support of Generalized Multi-Protocol Label Switching (GMPLS), Network Working Group, Request for Comments: 5307, Oct. 2008, 13 pages.
T. Li, IS-IS Extensions for Traffic Engineering, Network Working Group, Request for Comments: 5305, Oct. 2008, 18 pages.
T. Li, Domain-Wide Prefix Distribution with Two-Level IS-IS, Network Working Group, Request for Comments: 5302, Oct. 2008, 17 pages.

(Continued)

*Primary Examiner* — Melvin H Pollack
(74) *Attorney, Agent, or Firm* — Blakely Sokoloff Taylor & Zafman LLP

(57) ABSTRACT

An hierarchical LSP is established to transport packets belonging to a FEC attached to an egress LSR and includes an egress LSR LSP that is common for each of the FECs attached to the egress LSR and forms a path from the ingress LSR through intermediate LSR(s) to the egress LSR. The egress LSR LSP is used when label switching packets destined for the FECs attached to the egress LSR. The hierarchical LSP also includes a unique FEC LSP for each FEC that is used by the egress LSR to identify and forward packets to that FEC. Responsive to a topology change that changes a next-hop of the ingress LSR to reach the egress LSR, the ingress LSR modifies an entry in a forwarding structure to change the next-hop for the egress LSR LSP and does not modify substantially any forwarding structure entities for the FEC LSPs.

20 Claims, 10 Drawing Sheets

(56) References Cited

OTHER PUBLICATIONS

B. Decraene et al, LDP Extension for Inter-Area Label Switched Paths (LSPs), Network Working Group, Request for Comments: 5283, Jul. 2008, 13 pages.

L. Andersson et al, LDP Specification, Network Working Group, Request for Comments: 5036, Oct. 2007, 136 pages.

Y. Rekhter et al, A Border Gateway Protocol 4 (BGP-4), Network Working Group, Request for Comments: 4271, Jan. 2006, 105 pages.

Y. Rekhter et al, Carrying Label Information in BGP-4, Network Working Group, Request for Comments: 3107, May 2001, 9 pages.

E. Rosen et al, Multiprotocol Label Switching Architecture, Network Working Group, Request for Comments: 3031, Jan. 2001, 62 pages.

G. Malkin, RIP Version 2, Network Working Group, Request for Comments: 2453, Nov. 1998, 40 pages.

J. Moy, OSPF Version 2, Network Working Group, Request for Comments: 2328, Apr. 1998, 245 pages.

David Oran, OSI ISIS Intra-domain Routing Protocol, Network Working Group, Request for Comments: 1142, Feb. 1990, 206 pages.

Introduction to Intermediate System-to-Intermediate System Protocol, Copyright 1992-2002 Cisco Systems, Inc., May 8, 2006, 25 pages.

Jeff Doyle, Understanding MPLS Explicit and Implicit Null Labels, NetworkWorld.com, Jan. 19, 2008, 2 pages.

L. Andersson et al, LDP Specification, Network Working Group Request for Comments: 5036, Oct. 2007, 136 pages.

Awduche et al., "RSVP-TE: Extensions to RSVP for LSP Tunnels", Network Working Group Request for Comments: 3209, Dec. 2001, 61 pages, The Internet Society.

* cited by examiner

METHOD AND APPARATUS TO IMPROVE LDP CONVERGENCE USING HIERARCHICAL LABEL STACKING

FIELD

Embodiments of the invention relate to the field of networking; and more specifically, to improving LDP convergence using hierarchical label stacking.

BACKGROUND

Label Distribution Protocol (LDP) (described in Request For Comments (RFC) 5036, October 2007) is used to advertise mappings of Forward Equivalence Classes (FECs) to labels. IP (Internet Protocol) prefix FECs are used to setup Label Switched Paths (LSPs) along routed paths. LDP advertises label mappings for IP prefix FECs using routes in the routing table. As the number of FECs in the network increases the number of labels correspondingly increases. For example, in a label switched network of multiple Label Switched Routers (LSRs) that each run LDP, the egress LSR allocates a non-NULL label for each unique egress next-hop. If each prefix has a unique next-hop, a unique label will have to be allocated per prefix. In a wireless and/or wireline subscriber termination scenario with many subscribers (e.g., potentially thousands to millions), the number of labels that is allocated is large.

The LSRs that are not the egress for the prefix can know the association between the prefix (along with its associated label) and the egress LSR for that prefix using one of the following techniques: using the IP routing table to allocate labels for the FECs; running a link-state protocol (e.g., OSPF (Open Shortest Path First) described in RFC 2328, April 1998, IS-IS (Intermediate System to Intermediate System) described in RFC 1142, Feb. 1990), or running an additional protocol (e.g., BGP (Border Gateway Protocol) described in RFC 4271, January 2006).

However, the above techniques may in some cases not be possible or preferable. For example, in many cases there is a requirement that the edge LSRs run a simple routing protocol such as static or RIP (Routing Information Protocol) with BFD (Bidirectional Forwarding Detection) for redundancy. For example, an ingress LSR that is a base station network element in a wireless subscriber termination scenario may be required by the network provider to run a relatively simple non link-state routing protocol. These protocols do not give the association between the FEC and the egress LSR.

In addition, the convergence time for Interior Gateway Protocol (IGP) can be relatively high. For example, the time for IGP to converge is relatively high if there are a large number of prefixes and they are added and deleted to the routing table at a high rate (e.g., mobile subscribers that move between stations may cause the routing table to be modified relatively frequently). For example, a typical edge LSR in a wireless network (e.g., a 4G or LTE network) may support hundreds of thousands or millions of subscribers (each of which may have a unique prefix in IGP). IGP also has several dampening mechanisms that can increase the convergence time (e.g., LSA (link state advertisement) generation delay (e.g., through use of the MinLSInterval described in RFC 2328); LSA pacing timer (e.g., use of the retransmission timer (RxmtInterval) described in RFC 2328); and SPF (Shortest Path First) dampening timer). Furthermore, when the LSDB (Link State Database) is large, SPF performs many memory accesses during a typical SPF run and also requires a significant amount of processing and/or memory accesses when downloading the routes to a common store (e.g., a RIB (routing information base)). These all increase the convergence time for IGP.

Running an additional protocol such as BGP is not preferable since it adds overhead (both in capital expenditures (CapEx) and operational expenditures (OpEx)). For example, the overhead in CapEx includes the development resources required to develop and/or support another protocol including features such as scalability, high availability, and/or redundancy; extra CPU and/or memory needed to run the additional protocol, which increases with redundancy; the requirement of a full mesh of connections (one connection between every pair of LSRs in the network) increases the amount of computational resources (CPU cycles, memory, etc.) to grow as the number of LSRs in the network increases; and if a full mesh is avoided it requires a separate route-reflector (RR), which is a separate type of network element. The overhead in OpEx includes the introduction of complexity in the network design since BGP has to be configured on each of the LSRs; if an RR is used (which is typically a separate network element), it needs to be maintained by an operator; and configuring and maintaining the BGP protocol requires the expertise of specialized and expensive personnel.

SUMMARY

Improving LDP (Label Distribution Protocol) convergence time through use of a hierarchical LSP (Label Switched Path) is described herein. In one embodiment, a hierarchical LSP is established in an MPLS (Multi-Protocol Label Switching) network for multiple FECs (Forwarding Equivalence Classes) belonging to multiple end stations respectively. The hierarchical LSP for each FEC includes an egress LSR (Label Switched Router) LSP that is common for each of the FECs and forms a path an egress LSR for the FECs and is used when label switching packets in the MPLS network; and further includes a unique FEC LSP that is used by the egress to identify and forward packets to the FEC. Responsive to a topology change that changes a next-hop of the first network element for the egress LSR LSP, a forwarding structure is modified to change at least the next-hop for the egress LSR LSP without modifying substantially any forwarding structure entries for the FEC LSPs. LDP convergence time is improved through a reduction of forwarding structure modifications after the topology change.

In one embodiment, a network element acting as an egress LSR in an MPLS network performs the following operations. The network element generates an egress LSR label mapping message that includes a label mapped to an IP address of the first network element. For each FEC that belongs to an end station in which the network element is an egress, it generates a hierarchical label mapping message for that FEC that indicates a label originated by the network element for that FEC and indicates that the network element originated that label. The egress label mapping message and the hierarchical label mapping messages are transmitted to the peers of the network element to allow for the establishment of an hierarchical LSP for each FEC that includes an outer LSP that defines a path to reach the network element and includes an inner LSP specific to the FEC that is used by the network element to identify and forward packets to the FEC. The hierarchical LSP allows for the ingress LSR to react to a topology change that affects reachability to the egress LSR through changing one or more forwarding entries associated with the outer LSP without modifying substantially any forwarding entry associated with any of the inner LSPs, thereby improving LDP convergence time.

In one embodiment, a network element acting as an ingress LSR includes a control card that includes a hierarchical label module. The hierarchical label module is operative to process hierarchical label mapping messages originated from an egress LSR for a plurality of FECs belonging to the end stations that each include a mapping of a label originated by the egress LSR for a FEC and indicates that the egress LSR originated that label, and egress LSR label mapping messages originated from the egress LSR that each include a label mapped to an IP address of the egress LSR, such that a hierarchical LSP is established for each of the plurality of FECs. The hierarchical LSP for each FEC includes an egress LSR LSP based on the egress LSR label mapping message that is common for each of the FECs and provides a next-hop to the egress LSR, and a unique FEC LSP that carries information to identify and forward packets to the FEC. The hierarchical label module is further operative to download one or more forwarding structure entries representing the hierarchical LSP to one or more line cards of the network element. Responsive to a topology change that changes the next-hop to the egress LSR, the hierarchical label module is operative to modify and download to the one or more line cards one or more forwarding structure entries for the egress LSR LSP to change the next-hop for the egress LSR without modifying and downloading substantially any forwarding structure entries for the FEC LSPs. LDP convergence time is improved through a reduction of forwarding structure modifications after the topology change.

In one embodiment, a network element that acts as an egress LSR for multiple FECs includes a control card that includes an hierarchical label module that is operative to generate an egress LSR label mapping message that includes a label mapped to an IP address of the first network element. For each of the FECs, the hierarchical label module is operative to generate a hierarchical label mapping message for that FEC that indicates a label originated by the network element for that FEC and indicates that the network element originated that label, and is further operative to cause the generated egress LSR label mapping message and the hierarchical label mapping message to be transmitted to one or more network elements that act as intermediate or transit LSRs to allow for an establishment of a hierarchical LSP for each of the FECs that includes an outer LSP that defines a path to reach the IP address of the of the network element acting as an egress LSR and an inner LSP specific to that FEC that is used by the network element acting as an egress LSR to identify and forward packets to that FEC. The hierarchical LSP allows for the ingress LSR to react to a topology change that affects reachability to egress LSR through changing one or more forwarding entries associated with the outer LSP without modifying substantially any forwarding entry associated with any of the inner LSPs, thereby improving LDP convergence

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
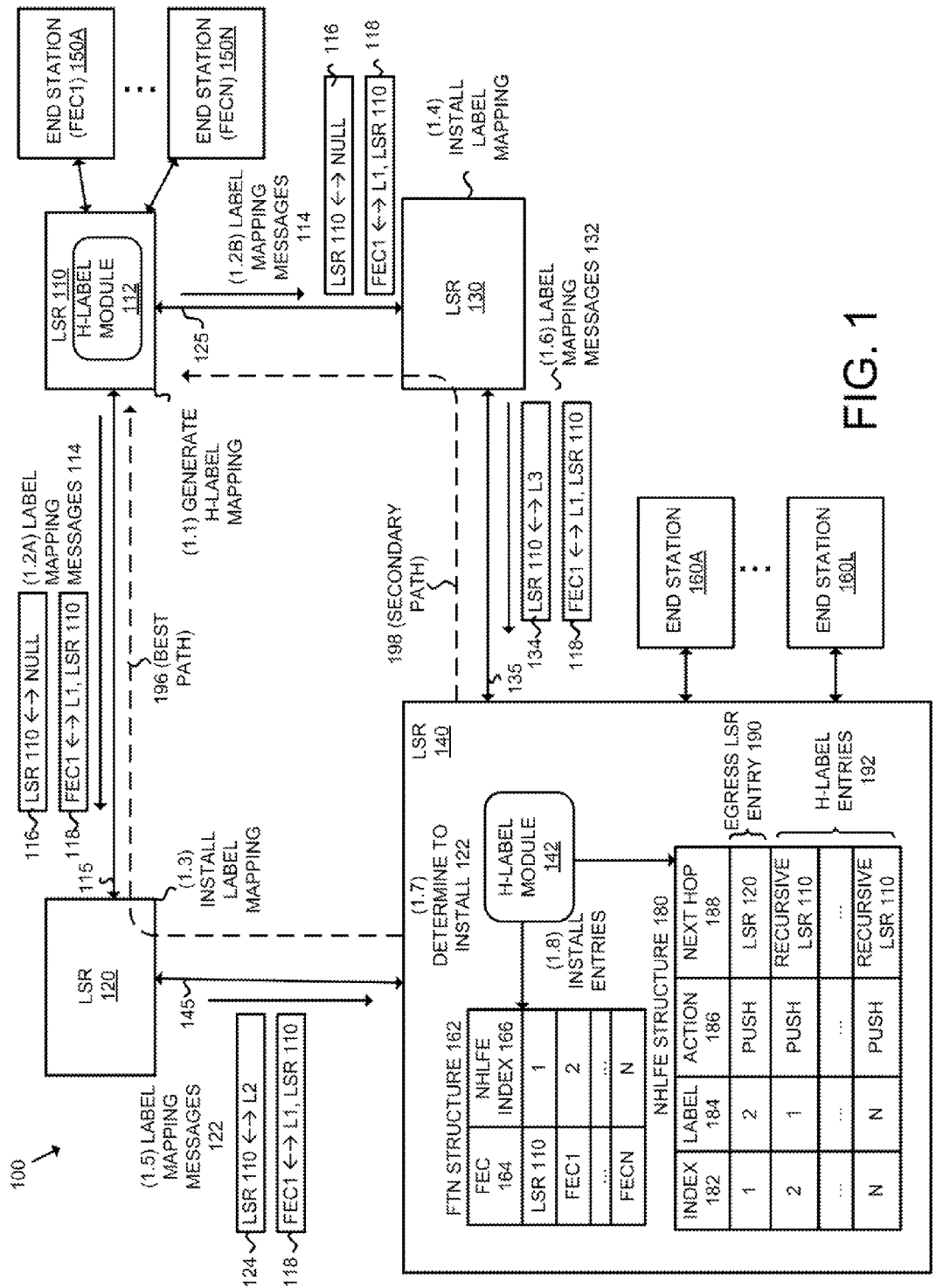
FIG. 1 is a data flow diagram illustrating distribution of a hierarchical label mapping message and management of hierarchical labels according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge, base station, etc.) is a piece of networking equipment, including hardware and software, that communicatively interconnects other equipment on the network (e.g., other network elements, end stations, etc.). Subscriber end stations (e.g., servers, workstations, laptops, palm tops, mobile phones, smartphones, multimedia phones, Voice Over Internet Protocol (VOIP) phones, portable media players, GPS units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public webpages (free content, store fronts, search services, etc.), private webpages (e.g., username/password accessed webpages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

A method and apparatus for improving LDP convergence using hierarchical label switched paths (LSPs) is described. In one embodiment, a network element that is acting as an egress LSR for a FEC advertises a label originated by that egress LSR for that FEC (referred herein as a hierarchical label mapping) that belongs to an inner LSP (sometimes referred herein as a FEC LSP) of a corresponding hierarchical LSP in addition to advertising a label (e.g., a NULL label) that is associated with an IP address of the egress LSR (e.g., a loopback address or other address that belongs to the egress LSR and has a path from the other LSRs) (referred herein as the egress LSR label mapping) that belongs to an outer LSP (sometimes referred herein as an egress LSR LSP) of the hierarchical LSP. By doing so, the mapping of a FEC to its corresponding egress LSR and its label mapping (the label being originated by that egress LSR) is distributed using LDP. Using these label mappings, an LSP hierarchy is used to transport packets belonging to that FEC. A path to the egress LSR for that FEC is lower in the hierarchy over which an LSP higher in the hierarchy (specific to that FEC) is tunneled.

Responsive to the path to the egress LSR changing that results in a nexthop change, only the nexthop corresponding to the path that is lower in the hierarchy needs to be reprogrammed in the data plane, which improves the convergence time for LDP and may decrease traffic loss duration during a link or node failure. In addition, only the label mappings to the egress LSR have to be carried in a routing protocol such as link-state IGP, thereby reducing the size of the information carried in the routing protocol resulting in faster routing protocol convergence.

The network elements that are acting as ingress LSRs and the network elements that are acting as transit LSRs install the label mapping belonging to the outer LSP (the egress LSR label mapping), which may be modified as it traverses from the egress to the ingress LSR. For example, transit LSRs swap the value of the label belonging to the outer LSP to one of their own label space (the association with the address of the egress LSR remains). The network element acting as the ingress LSR for the hierarchical LSP installs the hierarchical label mapping for the FEC in its NHLFE (Next-Hop Label Forwarding Entry) structure such that when forwarding packets to that FEC the hierarchical LSP is used. For example, in one embodiment, the network element acting as an ingress LSR installs an entry for the label mapping corresponding to the outer LSP in its NHLFE (referred herein as the egress LSR label mapping entry) and installs an entry for the hierarchical label mapping that includes a recursive next-hop to the label mapping corresponding to the outer LSP (referred herein to as the hierarchical label mapping entry). When forwarding packets destined to one of the FECs, the ingress LSR looks up the FEC in its FTN to determine the corresponding NHLFE structure. The resulting NHLFE indicates a FEC label to push onto the label stack (the label originated by the egress LSR for that FEC) and includes a recursive next-hop to the egress LSR label mapping. The ingress LSR pushes the FEC label onto the stack and accesses the NHLFE corresponding to the egress LSR label mapping, which includes a label to push onto the stack and a next-hop towards the egress LSR. The ingress LSR pushes that label onto the label stack and transmits the labeled packet to the next-hop identified in the label mapping to reach the egress LSR. The hierarchical labeled packets are label switched in the network based on the outer label with the exception of the egress LSR (and possibly the penultimate intermediate LSRs that perform penultimate hop popping).

Responsive to a topology change that affects the reachability of the egress LSR (e.g., a link failure, a node failure, a metric change, a new route exists, etc.) and assuming that a different route to the egress LSR exists (although it may be a suboptimal route), only the label entry in the NHLFE structure belonging to the outer LSP (the egress LSR label mapping entry) needs to be changed rather than each entry for each FEC attached to the egress LSR. Thus, instead of requiring a modification of each of the entries for the FECs, only the entry that corresponds to reaching the egress LSR for those FECs needs to be modified. This improves the convergence time for LDP and may decrease traffic loss duration during a link or node failure.

FIG. 1 is a data flow diagram illustrating distribution of a hierarchical label mapping message and management of hierarchical labels according to one embodiment. The network 100 includes the LSRs (Label Switched Routers) 110, 120, 130, and 140, which are part of the same MPLS domain. Each of the LSRs 110, 120, 130, and 140 are implemented on a network element. The LSR 140 is coupled with the LSR 120 over the link 145 and is coupled with the LSR 130 over the link 135. The LSR 110 is coupled with the LSR 120 over the link 115 and is also coupled with the LSR 130 over the link 125. It should be understood that the number of LSRs illustrated is exemplary as there may be more or less LSRs in the network.

Figure 2:
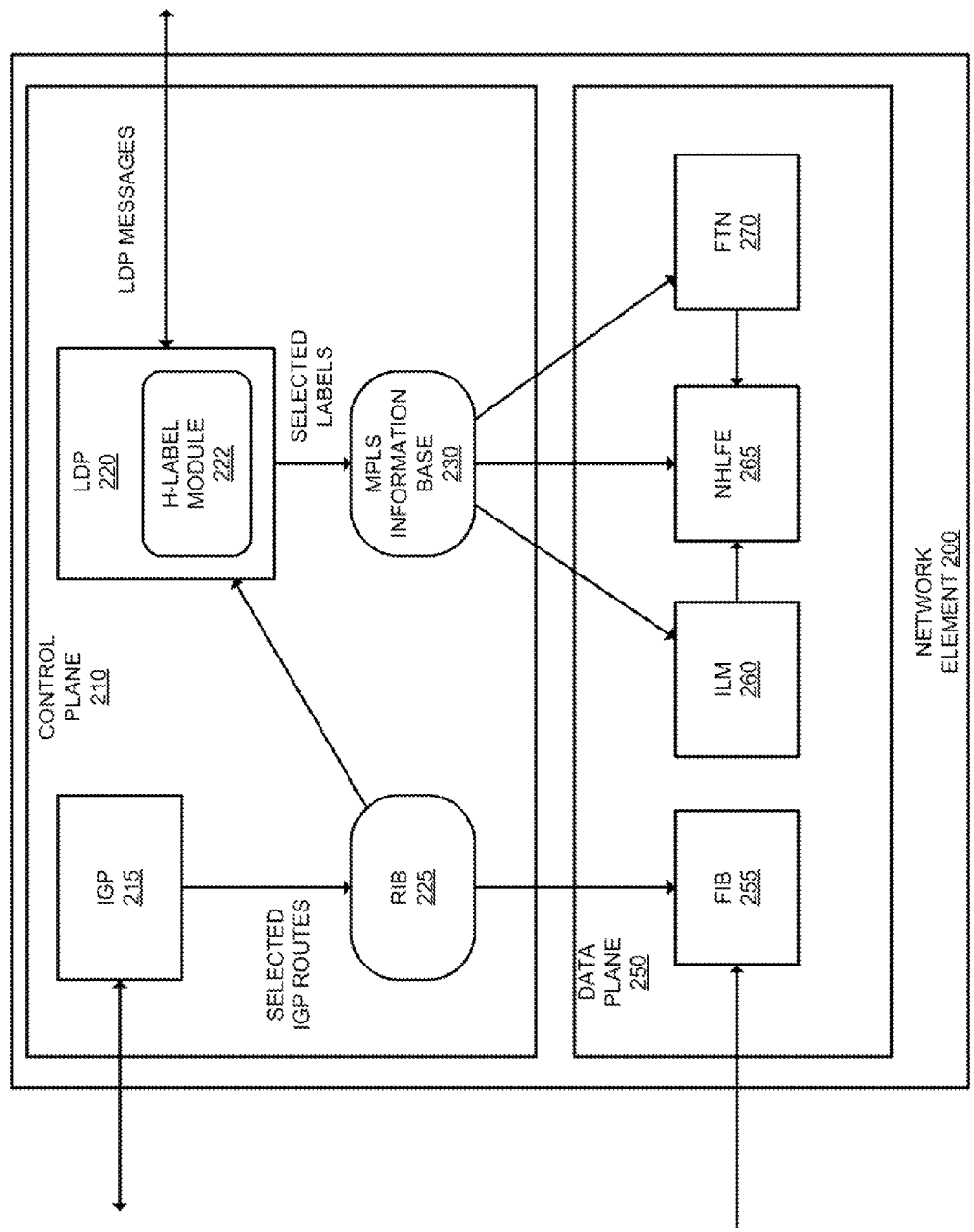
FIG. 2 is a block diagram that illustrates an exemplary network element that is acting as an LSR in more detail according to one embodiment.

FIG. 2 illustrates an exemplary network element that is acting as an LSR in more detail according to one embodiment. The network element 200 includes the control plane 210 and the data plane 250 (sometimes referred to as a forwarding plane or a media plane). The control plane 210 determines how data (e.g., packets) is routed (e.g., the next-hop for the data and the outgoing port for the data) and the data plane 250 is in charge of forwarding that data. The control plane 210 includes the IGP (Interior Gateway Protocol) module 215 and the LDP (Label Distribution Protocol) module 220. The IGP module 215 may be running a link-state protocol such as OSPF (Open Shortest Path First) or IS-IS (Intermediate System to Intermediate System), or running another protocol such as RIP (Routing Information Protocol). The IGP module 215 communicates with other network elements to exchange routes and select those routes based on one or more routing metrics. The IGP routes that are selected are stored in the RIB (Routing Information Base) 225. The IGP module 215 can also cause the route entries which are not selected and stored in the RIB 225 to be stored in a local RIB (e.g., an IGP local RIB).

The LDP module 220 exchanges label mapping information with its peers (LDP peers). For example, the LDP module 220 may generate label mapping messages and receive label mapping messages from its peers. The LDP module 220 relies on the underlying routing information provided by the IGP module 215 to the RIB 225 in order to forward label packets. The LDP module 220 allocates labels and stores other information related to forwarding label packets (e.g., NHLFE information, ILM (Incoming Label Map) information, FTN information) in the MPLS information base 230. The LDP module 220 includes the hierarchical label module 222 which extends the functionality of the LDP module 220 to support hierarchical labels during label mapping origination and label management, which will be described in greater detail later herein.

The control plane 210 programs the data plane 250 with route information based on the RIB 225 and the MPLS information base 230. Specifically, certain information from the RIB 225 is programmed to the FIB (Forwarding Information Base) 255 and certain information from the MPLS information base 230 is programmed to the ILM structure 260, the NHLFE structure 265, and the FTN structure 270.

In one embodiment the network element 200 includes a set of one or more line cards (sometimes referred to as forwarding cards) and a set of one or more control cards. The set of line cards and control cards are coupled together through one or more mechanisms (e.g., a first full mesh coupling the line cards and a second full mesh coupling all of the cards). The set of line cards typically make up the data plane and may each store the FIB 255, the ILM 260, the NHLFE 265, and the FTN 270 which will be used when forwarding packets. Specifically, the FTN 270 is used for forwarding packets that are unlabeled (e.g., they are received from outside the MPLS domain at the ingress LSR) but are to be labeled before forwarding. The ILM 260 is used for forwarding labeled packets. The control cards typically run the routing protocols including the IGP module 215, the LDP module 220, and store the RIB 225 and the MPLS information base 230.

FIG. 1 and subsequent figures will be described with reference to LSR 110 acting an egress LSR for the end stations 150A-N that have FECs 1-N respectively, LSR 140 acting an ingress LSR, and the LSRs 120 and 130 acting as intermediate (transit) LSRs. Thus, the end stations 150A-N will be described with respect to being destinations of packets (although it should be understood that the end stations 150A-N may also be the source of packets). Thus, in order to reach the end stations 150A-N, packets must travel through the LSR 110. It should be understood that there may be other network elements and/or equipment between the LSR 110 and the end station 150A-N (e.g., access network element(s)). Each of the FECs 1-N is an identifier (e.g., an IP address prefix, a host address, a pseudowire ID (PWID) for transporting pseudowire) that identifies a destination for transmission of packets over an LDP LSP. As depicted in FIG. 1, each of the end stations 150A-N are associated with a different FEC. For purposes of simplicity, the FECs for the end stations 150A-N will be described as being an IP address prefix, but it should be understood that one or more of the FECs may be different (e.g., host address, PWID). The end stations 160A-L, which may either be subscriber end stations or server end stations, are described in FIG. 1 and subsequent figures as being the source of packets to be sent to the end stations 150A-N, however it should be understood that they may also be the destination of packets.

In one embodiment, the LSRs 110, 120, 130, and 140 each have an architecture similar to the network element 200, while in other embodiments the intermediate LSRs 120 and 130 do not include an H-label module. Each of the LSRs 110, 120, 130, and 140 run an IGP implementation (e.g., link state protocols such as OSPF or IS-IS, RIP, static) that determines a best path from source to destination. Each of the LSRs 110, 120, 130, and 140 also runs an LDP implementation that follows the best path as determined by the IGP protocol. With reference to FIG. 1, the best path from the LSR 140 to reach the LSR 110 is through the LSR 120 (represented by the dashed best path line 196). A secondary path from the LSR 140 to reach the LSR 110 is through the LSR 130 (represented by the dashed secondary path line 198). Thus, the best path from traffic sent by the end stations 160A-L to the end stations 150A-N goes through the LSR 120.

The LSR 110 includes the hierarchical label (H-Label) module 112 and the LSR 140 includes the H-Label module 142 (which are part of their respective control planes in one embodiment). The H-Label module 112 generates and causes label mapping messages that include hierarchical label mappings for the FECs for which it is an egress. The H-Label module 142 processes received label mapping messages that include hierarchical label mappings including installing a hierarchical label entry in one or more structures and installing the FEC labels with a recursive next-hop to the egress LSR 110. Thus, the H-Label module 112 extends the functionality of existing LDP label mapping origination to support hierarchical label mappings and the H-Label module 142 extends the functionality of existing LDP label management to support hierarchical label mappings. It should be understood that although the H-Label module 112 is described as originating hierarchical label mappings (essentially acting as an egress H-Label Module) and the H-Label module 142 is described as processing received hierarchical label mappings (essentially acting as an ingress H-Label Module), one or more of the modules may include both functionality. According to one embodiment, the H-Label modules 112 and 142 are part of the LDP modules that run LDP of the LSRs 110 and 140. According to one embodiment, the intermediate LSRs 120 and 130 do not include a specific H-Label module and instead run a standard LDP mechanism. The LSR 110 further includes the FTN structure 162 and the NHLFE structure 180, which are each managed by the H-label module 142. In one embodiment, the FTN structure 162 and the NHLFE structure 180 are part of the data plane of the LSR 140 and may be at least partially stored on one or more line cards of the LSR 140.

When generating a label mapping message to advertise label bindings to peers for each of the different FECs it is acting as an egress for, the H-Label module 112 of the egress LSR 110 includes a hierarchical label mapping that maps that FEC to a non-null label and indicates that the label was originated by the egress LSR 110. In addition, the egress LSR 110 advertises a label mapping message that includes an egress LSR label mapping message that maps the IP address of the egress LSR 110 with a label (e.g., a NULL label). These label mappings are transmitted to each of the neighbors of the LSR 140 (e.g., the LSRs 120 and 130).

The combination of the hierarchical label mappings and the egress LSR label mapping that are propagated through LDP provide an association between the egress LSR and the FECs. Thus, even in cases where the IGP implementation is a non link-state protocol such as RIP or static routes, the association between the egress LSR and the FECs can be obtained. This obviates the necessity for IGP to carry the information using a link-state protocol such as OSPF or IS-IS; eliminates the problem of IGP convergence slowdown due to carrying a large number of FECs/routes (e.g., in embodiments of the invention IGP can carry only minimal information such as the loopback addresses and the links between the label switched routers and not the FECs), thereby resulting in faster IGP convergence; and also avoids the complexity of running another protocol such as BGP or having a full-mesh of LDP peers to convey the FEC information throughout the network. Thus, label switching is based on the reachability of the egress LSR rather than the reachability of the FEC devices.

Figure 3:
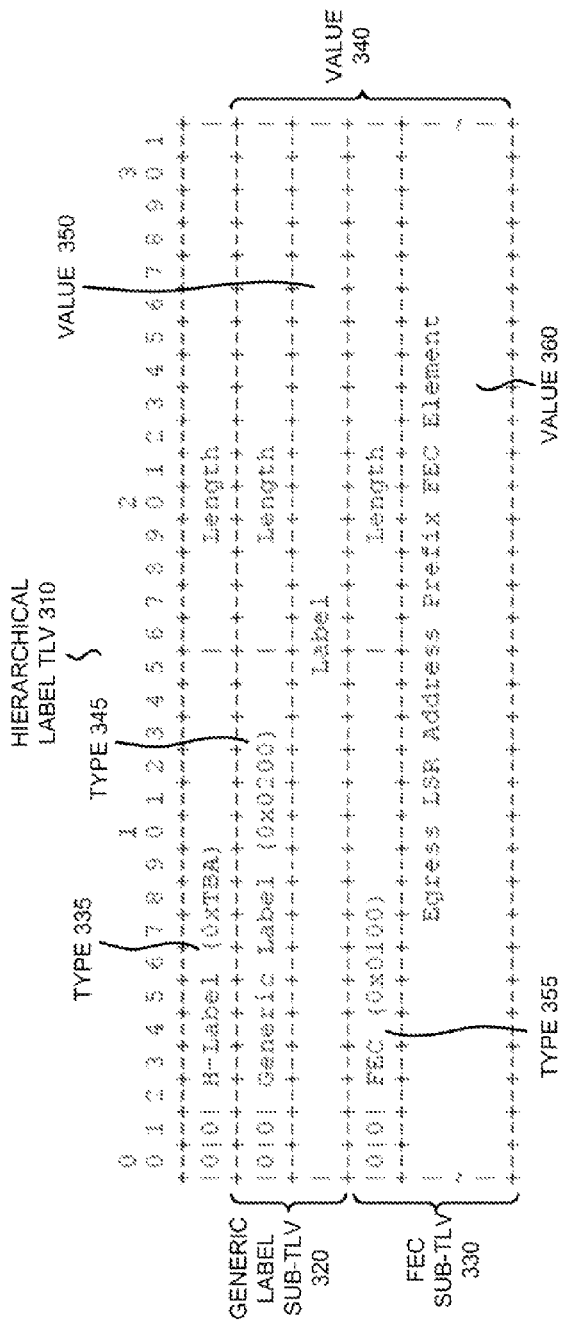
FIG. 3 illustrates an exemplary message format for a hierarchical label mapping that is used in a label mapping message according to one embodiment.

FIG. 3 illustrates an exemplary message format for a hierarchical label mapping that is used in a label mapping message according to one embodiment. The hierarchical label TLV (type-length-value) 310 includes the generic label sub-TLV 320 and the FEC sub-TLV 330 as the value 340. The type 335 of the hierarchical label TLV 310 indicates that the message includes a hierarchical label mapping. The generic label sub-TLV 320 is similar to the generic label TLV described in RFC 5036. The generic label sub-TLV 320 is used to encode the label for the FEC. The generic label sub-TLV 320 includes the type 345 which indicates that it is a generic label, and the label as the value 350 (the label is typically a non-NULL label). The FEC sub-TLV 330 is similar to the FEC TLV described in RFC 5036. The FEC sub-TLV 330 is used to encode a FEC of the egress LSR (e.g., the loopback address of the egress LSR). The FEC sub-TLV 330 includes the type 355 that indicates that it is a FEC TLV, and the Egress LSR Address Prefix FEC Element as the value 360 (e.g., the loopback address of the egress LSR). In one embodiment, there is only a single address as the value 360.

Figure 4:
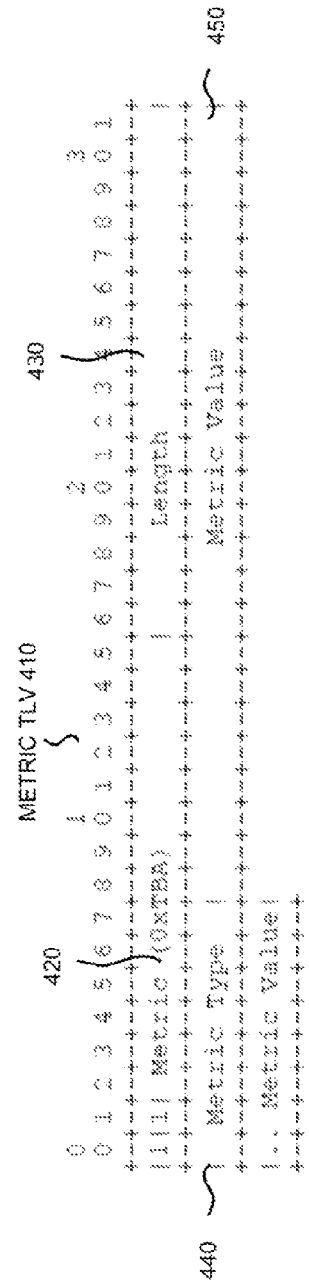
FIG. 4 illustrates an exemplary message format for a metric TLV that is used in a label mapping message according to one embodiment.

In some embodiments a metric TLV may also be included in the hierarchical label mapping message. The metric TLV is used to propagate metrics associated with the FECs. FIG. 4 illustrates an exemplary format for a metric TLV according to one embodiment. The metric TLV 410 includes the type 420 that indicates that the message is a metric TLV, the length 430, the metric type 440, and the metric value 450. The metric type 440 indicates the type of metric (e.g., zero indicates intra-area, one indicates inter-area, 0xf indicates an external route of a metric that is higher than any internal metric). The specific value of the metric type 440 may depend on the type of IGP implementation being used. The metric value 450 indicates the value for the metric. In some embodiments, if a metric TLV is not included in a label mapping message that includes a hierarchical label mapping, then the label mapping message is treated as having a metric type of zero and metric value of zero.

The LSRs use the metric TLVs to determine which hierarchical label mapping to install when receiving multiple hierarchical label mappings for a single FEC that have been originated from a different egress LSR. For example, if an ingress LSR receives multiple hierarchical label mappings for a single FEC from different neighbors that was originated from a different egress LSR, the LSR will select one of those hierarchical label mappings to install. In one embodiment, a metric TLV with a metric type N is lower than a metric TLV with a metric type N+1, regardless of the metric values. If metric TLVs have the same metric type (with the exception of type 0x0f), the comparison is made on the value obtained by adding the metric from the RIB for the route to the egress address prefix FEC element (identified in the H-Label TLV) to the metric value of the metric-TLV. If metric TLVs have the same metric type of 0x0f, then the comparison is made using only the metric value of the metric TLVs. If the values are the same after comparison, then they are considered equal-cost (one of them may then be randomly selected).

Referring back to FIG. 1, consider the LSR 110 generating and transmitting a label mapping message for the FEC1 associated with the end station 150A. At operation 1.1, the H-Label module 112 generates label mapping messages 114 including an egress LSR label mapping message 116 that includes the IP address of the LSR 110 (e.g., the loopback address of the LSR 110) mapped to a NULL label, and further including a hierarchical label mapping message 118 that maps the FEC1 mapped to a non-NULL label originated by the LSR 110 (label 1) and includes an indication that LSR 110 originated that non-NULL label. The egress LSR label mapping message 116 may be generated and transmitted prior to generation and/or transmission of the hierarchical label mapping message 118. Together, the egress LSR label mapping message 116 and the hierarchical label mapping message 118 allow the establishment of a hierarchical LSP that includes an egress LSR LSP and a FEC LSP. The egress LSR LSP will be used when label switching packets directed to the FEC and the FEC LSP will be used by the egress LSR to identify and forward packets to that FEC. The FEC LSP is tunneled within the egress LSR LSP. The egress LSR LSP will be common to each of the FECs 1-N associated with the end stations 150A-N respectively.

Figure 5:
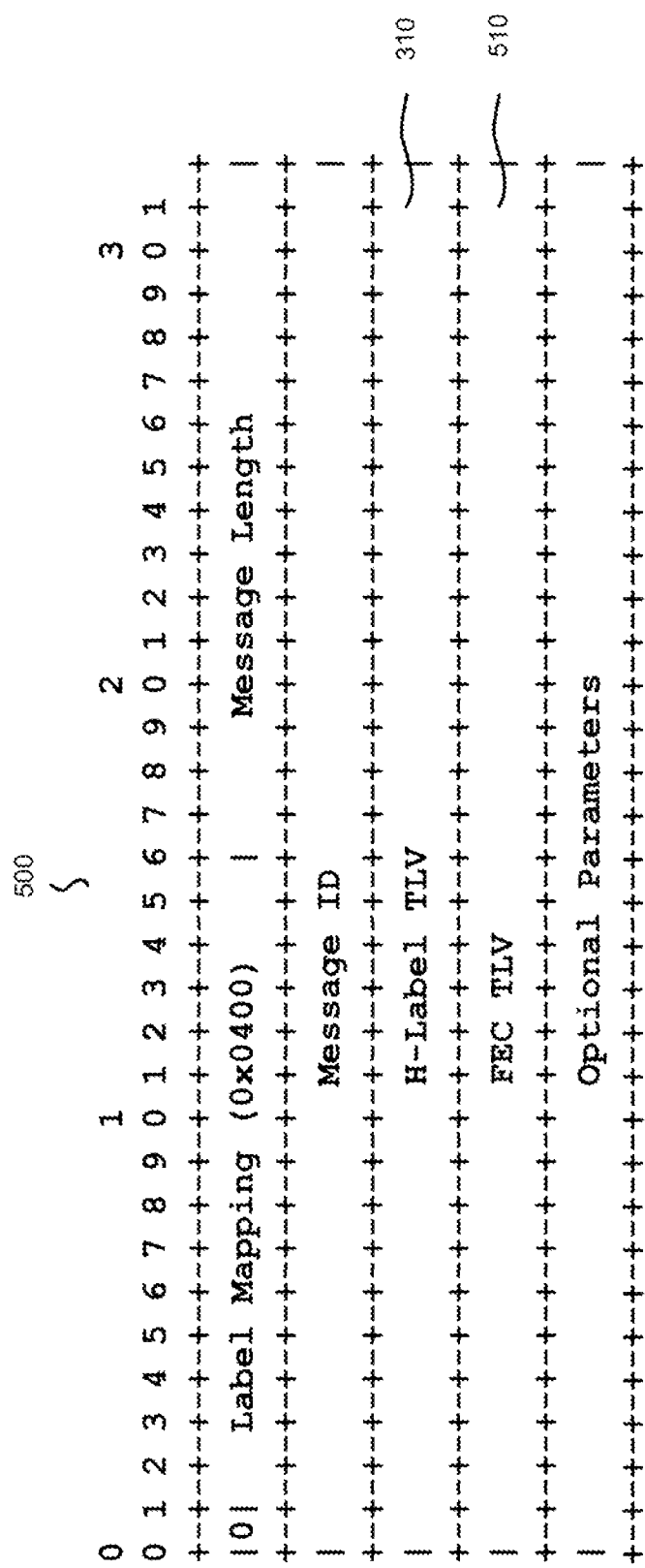
FIG. 5 illustrates an exemplary message format for a label mapping message according to one embodiment.

In one embodiment, the hierarchical label TLV described in FIG. 3 is used instead of or in addition to a Label TLV (as defined in RFC 5036) for the hierarchical label mapping. FIG. 5 illustrates an exemplary format for an hierarchical label mapping message 500 that includes the hierarchical label TLV 310 stacked on top of a FEC TLV 510. When used in the example depicted in FIG. 1, the hierarchical label TLV 310 indicates a mapping between the non-NULL label (label 1) with the IP address of the egress LSR 110 and the FEC TLV 510 indicates the FEC1 (e.g., the IP address prefix of the end station 150A).

Figure 6:
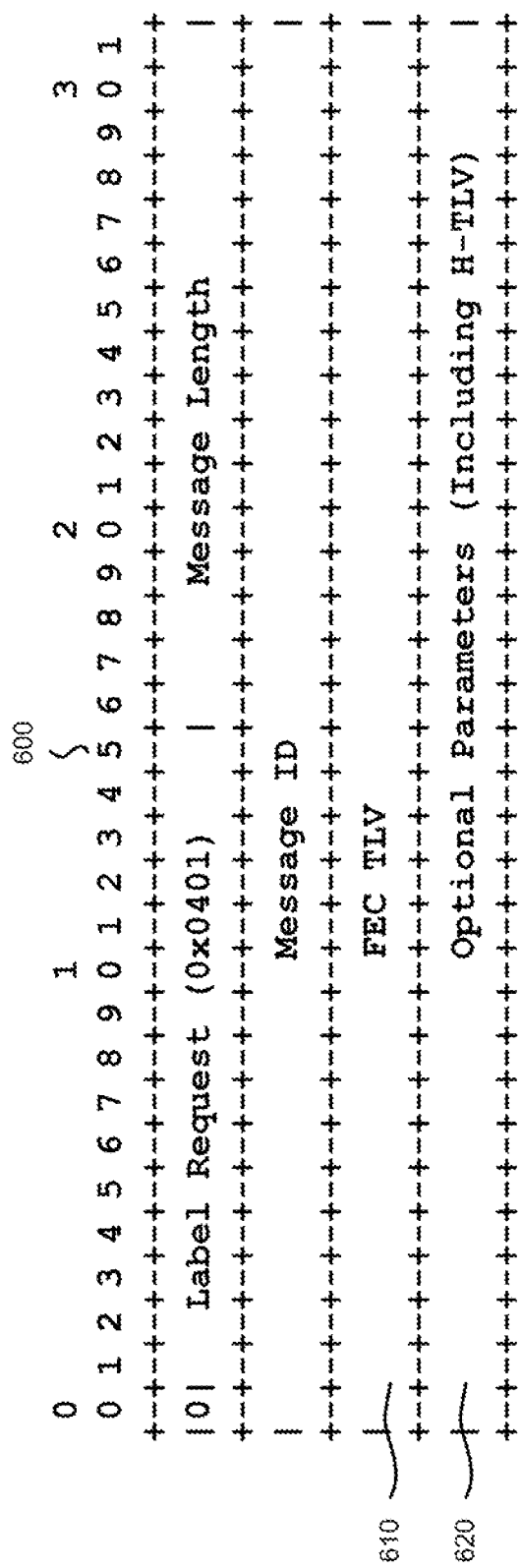
FIG. 6 illustrates an exemplary message format for a label request message according to one embodiment.

In some embodiments, the LSR 110 generates the label mapping messages 114 (e.g., the egress LSR label mapping message 116 and/or the hierarchical label mapping message 118) responsive to receiving a label request message. The label request message is used to request a label binding (mapping) for one or more FECs (e.g., it can contain a wildcard FEC TLV element to request multiple label bindings). FIG. 6 illustrates an exemplary format for the label request message 600 according to one embodiment. The label request message 600 includes the FEC TLV 610, which identifies the FEC for which a label is requested (the FEC TLV 610 may include a wildcard), and includes the optional parameters 620. The optional parameters 620 may include a hierarchical label TLV. If the FEC TLV 610 is a wildcard, then all of the label mappings are returned in the response (which leads to multiple label mapping messages being generated and transmitted). In response to the label request message, the LSR 110 may include a More Label TLV in the label mapping message. The presence of a More Label TLV indicates that more label mappings will be sent for the FEC in response to the label request message.

Sometime after generating the label mapping messages 114, the messages are transmitted to the peers of the LSR 110. Thus, at operation 1.2A the generated label mapping messages 114 including the egress LSR label mapping message 116 and the hierarchical label mapping message 118 are transmitted to the LSR 120 over the link 115 and are transmitted to the LSR 130 over the link 125 at operation 1.2B.

After receiving the label mapping messages, at operations 1.3 and 1.4 the intermediate LSRs 120 and 130 respectively install at least the egress LSR label mapping. For example, they install a label and the IP address of the egress LSR 110 in their NHLFE structure and create an entry in their ILM structures such that they can perform label swapping (or a penultimate pop). For example, each of the LSRs 120 and 130 install an entry in their NHLFE that includes an outgoing label (belonging to the outer label of the hierarchical LSP) (e.g., the NULL label), a swap action (or a pop action if performing penultimate popping), the next-hop to reach the LSR 110 (which in this case is the LSR 110), the outgoing interface, and may include other data handling information.

Each of the LSRs 120 and 130 allocates a label from their respective label space for the egress LSR label mapping. For example, the LSR 120 allocates the label 2 for the egress LSR label mapping and the LSR 130 allocates the label 3 for the egress LSR label mapping. The LSRs 120 and 130 create an entry in their respective ILM structure to map the allocated label for the egress LSR label mapping (which will be received as an incoming label during packet forwarding) to the NHLFE for the IP address of the LSR 110. Thus, when the LSR 120 receives a labeled packet that has the label 2 as the incoming label (which will be described in greater detail with respect to FIG. 8), the ILM entry for the label 2 is accessed that includes a pointer to the entry in the NHLFE structure for the IP address of the LSR 110. Similarly, when the LSR 130 receives a labeled packet that has the label 3 as the incoming label (which will be described in greater detail with respect to FIG. 11), the ILM entry for the label 3 is accessed that includes a pointer to the entry in the NHLFE structure for the IP address of the LSR 110. In some embodiments the intermediate LSRs 120 and 130 do not process the hierarchical label mapping message 118 beyond forwarding the message to their respective peers (which in the example depicted in FIG. 1 is the LSR 140).

While FIG. 1 illustrates the LSR 120 and the LSR 130 each receiving a single hierarchical label mapping message per FEC, it should be understood that there are situations where they receive multiple hierarchical label mapping messages for a single FEC from multiple neighbors. In one embodiment, when a transit LSR receives hierarchical label mapping messages for a single FEC from multiple neighbors, it selects some of these label mappings for advertising and/or installation (the transit LSR will install the label mappings in case it has a neighbor that does not have the capability to process the hierarchical label mapping described herein). In one embodiment, the hierarchical label mappings that are received from neighbors that are the nexthop for the IP address indicated in the hierarchical label are chosen and advertised to all LDP neighbors (assuming those LDP neighbors are capable of processing hierarchical label mappings). If there is a neighbor that is not capable of processing the hierarchical label mappings, the intermediate LSR should install the hierarchical label mapping in a similar way as an ingress LSR would install that hierarchical label mapping (including the comparison of the metric type and metric value indicated in the metric-TLV if applicable).

Sometime after installing the egress LSR label mappings, at operations 1.5 and 1.6 respectively the intermediate LSRs 120 and 130 respectively generate and transmit the label mapping messages 122 and 132 to the LSR 140. As illustrated in FIG. 1, the label mapping messages 122 include the egress LSR label mapping message 124 that maps the IP address of the egress LSR 110 and the label 2, and includes the hierarchical label mapping message 118. The label mapping messages 132 include the egress LSR label mapping message 134 that maps the IP address of the egress LSR 110 with the label 3, and includes the hierarchical label mapping message 118. Thus, while the LSRs 120 and 130 have each modified the egress LSR label mapping by changing the egress LSR label to one in their label space, the hierarchical label mapping 118 remains unchanged.

The LSR 140 may store the information included in the label mapping messages 122 and the label mapping messages 132 in an IGP data structure. For example, in one embodiment, the information is stored in a Link State Database (LSDB). After receiving the label mapping messages, at operation 1.7 the H-label module 142 of the LSR 140 determines to select to install the label mapping messages 122 received from the LSR 120 in its data plane over the label mapping messages 132 received from the LSR 130. In one embodiment, this decision is based on the best route as determined by IGP and further refined (if necessary) by a metric value (e.g., if a metric TLV is included in the label mapping messages).

At operation 1.8, the H-Label module 142 installs the label mapping messages 122 such that an LSP hierarchy will be used when transporting packets belonging to FEC1. Thus, when receiving a packet for the FEC 1, the ingress LSR 140 will push the label originated by the LSR 110 for FEC1 onto the label stack (the inner label) and will push the label to reach the egress LSR 110 (the label 2 in the depicted example) (the outer label) onto the label stack. For example, the H-Label module 142 causes an entry to be installed in the NHLFE structure 180 for the egress LSR label mapping included in the egress LSR label mapping message 124 and the hierarchical label mapping included in the hierarchical label mapping message 118. The NHLFE for the egress LSR label mapping includes the label 2, a push action, and the next-hop (an IP address to LSR 120). This NHLFE will be used when putting on the outer label of the hierarchical LSP. The NHLFE for the label belonging to the FEC1 includes the label 1, a push action, and a recursive next-hop to the IP address of the egress LSR 110. The H-label module 142 also causes an entry to be installed in the FTN structure 162 for the FEC1 associated with the end station 150A.

As illustrated in FIG. 1, the FTN structure 162 includes the FEC index 164 and the NHLFE index 166 which acts as a pointer into the NHLFE structure 180. The NHLFE structure 180 includes the index 182 that corresponds to the NHLFE index 166, the outgoing label field 184, the action field 186, and the next-hop field 188. The NHLFE structure 180 may also include additional information (e.g., outgoing interface, other data handling information). As illustrated in FIG. 1, the FTN structure 162 includes entries for each of the FECs associated with the end stations 150A-N. In addition, the NHLFE structure 180 includes an egress LSR label entry 190 for the egress LSR label mapping (e.g., generated from the egress LSR label mapping message 124) and the hierarchical label entries 192 for the hierarchical label mappings (e.g., in the depicted example of FIG. 1, the entry for the FEC1 is generated based on the hierarchical label mapping message 118). While separate structures for the FTN and NHLFE are illustrated, it should be understood that in some embodiments that there is a single structure representing the FTN and NHLFE. While FIG. 1 illustrates a particular way of installing the label mapping messages 122 such that an LSP hierarchy will be used when transporting packets belonging to the FEC1, it should be understood that it is exemplary and the label mapping messages 122 may be installed in a different way while still creating an LSP hierarchy when transporting packets belonging to the FEC1. In addition, while the depicted example in FIG. 1 is specific to FEC 1, it should be understood that similar operations are performed for each of the FECs 1-N.

Figure 7:
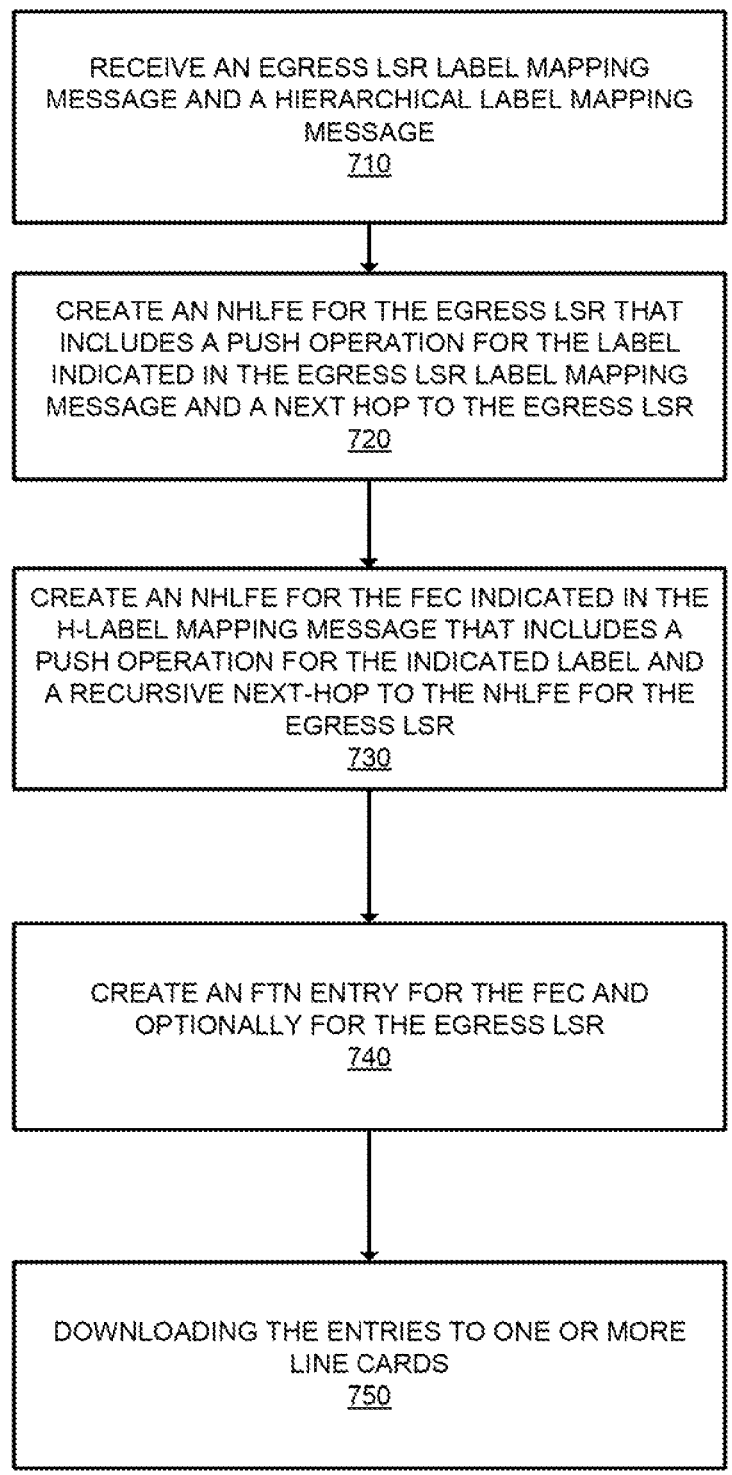
FIG. 7 is a flow diagram that illustrates exemplary operations for an ingress LSR installing label mapping messages such that an LSP hierarchy will be used when transporting packets belonging to a particular FEC according to one embodiment.

FIG. 7 is a flow diagram that illustrates exemplary operations for an ingress LSR installing label mapping messages such that an LSP hierarchy will be used when transporting packets belonging to a particular FEC according to one embodiment. The operations of FIG. 7 will be described with reference to FIG. 1. However, it should be understood that the operations of FIG. 7 can be performed by embodiments of the invention other than those discussed with reference to FIG. 1, and the embodiments discussed with reference to FIG. 1 can perform operations different than those discussed with reference to FIG. 7.

At block 710, the LSR 140 receives an egress LSR label mapping message and a hierarchical label mapping message from the LSR 120. The label mapping messages can be received at different times. The egress LSR label mapping message indicates a mapping for a FEC (e.g., IP address prefix) of the egress LSR 110 with a label. The hierarchical label mapping message indicates a mapping for a FEC associated with an end station (e.g., one of the end stations 150A-N) with a label originated by an egress LSR and also identifies the egress LSR that originated that label.

Flow then moves to block 720 and the H-Label module 142 creates an NHLFE for the mapping of the egress LSR 110 with the identified label that includes a push operation for the identified label and a next-hop to the LSR 120. Flow then moves to block 730 and the H-Label module 142 creates an NHLFE for the FEC indicated in the hierarchical label mapping message that includes a push operation for the label indicated in the hierarchical label mapping message and a recursive next-hop to the NHLFE for the egress LSR 110. The recursive next-hop to the NHLFE for the egress LSR 110 will cause another lookup to be performed (the NHLFE for the egress LSR 110 to be accessed).

Flow then moves to block 740 and the H-Label module 142 creates an FTN entry for the hierarchical label mapping corresponding to the FEC indicated in the hierarchical label mapping message and optionally creates an FTN entry for egress LSR label mapping corresponding to the IP address prefix of the ingress LSR 140. Flow then moves to block 750 and the created entries are downloaded to one or more line cards of the LSR 140. For example, the NHLFE entries are downloaded to the NHLFE structure 180 (which may be stored on one or more line cards) and the FTN entry(ies) are downloaded to the FTN structure 162 (which may be stored on one or more line cards).

As illustrated in FIG. 1, the egress LSR entry 190 includes the label 2 that was mapped to the IP address of the egress LSR 110 in the egress LSR label mapping message 124, a push action, and a next-hop of the LSR 120. The FEC label entry installed for the FEC associated with the end station 150A includes the corresponding label 1 that was included in the hierarchical label mapping message 118, a push action, and a recursive next-hop to the NHLFE for the egress LSR 110. The recursive next-hop indicates that an additional lookup based on the IP address of the egress LSR 110 will be performed when forwarding packets.

Figure 8:
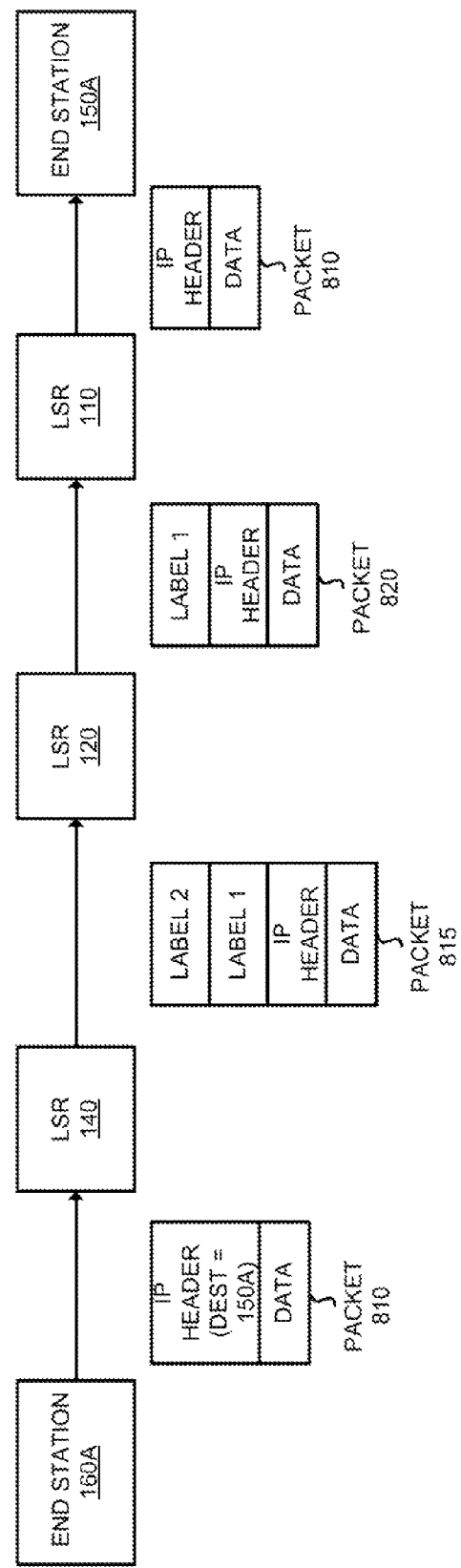
FIG. 8 illustrates an exemplary packet flow using the hierarchy of LSPs according to one embodiment.

FIG. 8 illustrates an exemplary packet flow from the end station 160A to the end station 150A using the hierarchy of LSPs according to one embodiment. FIG. 8 will be described with reference to FIG. 1 and FIG. 9, which illustrates exemplary operations performed by an ingress LSR when receiving a packet destined for a remote FEC. However, it should be understood that the operations of FIG. 9 can be performed by embodiments of the invention other than those discussed with reference to FIGS. 1 and 9, and the embodiments discussed with reference to FIGS. 1 and 9 can perform operations different than those discussed with reference to FIG. 9.

Figure 9:
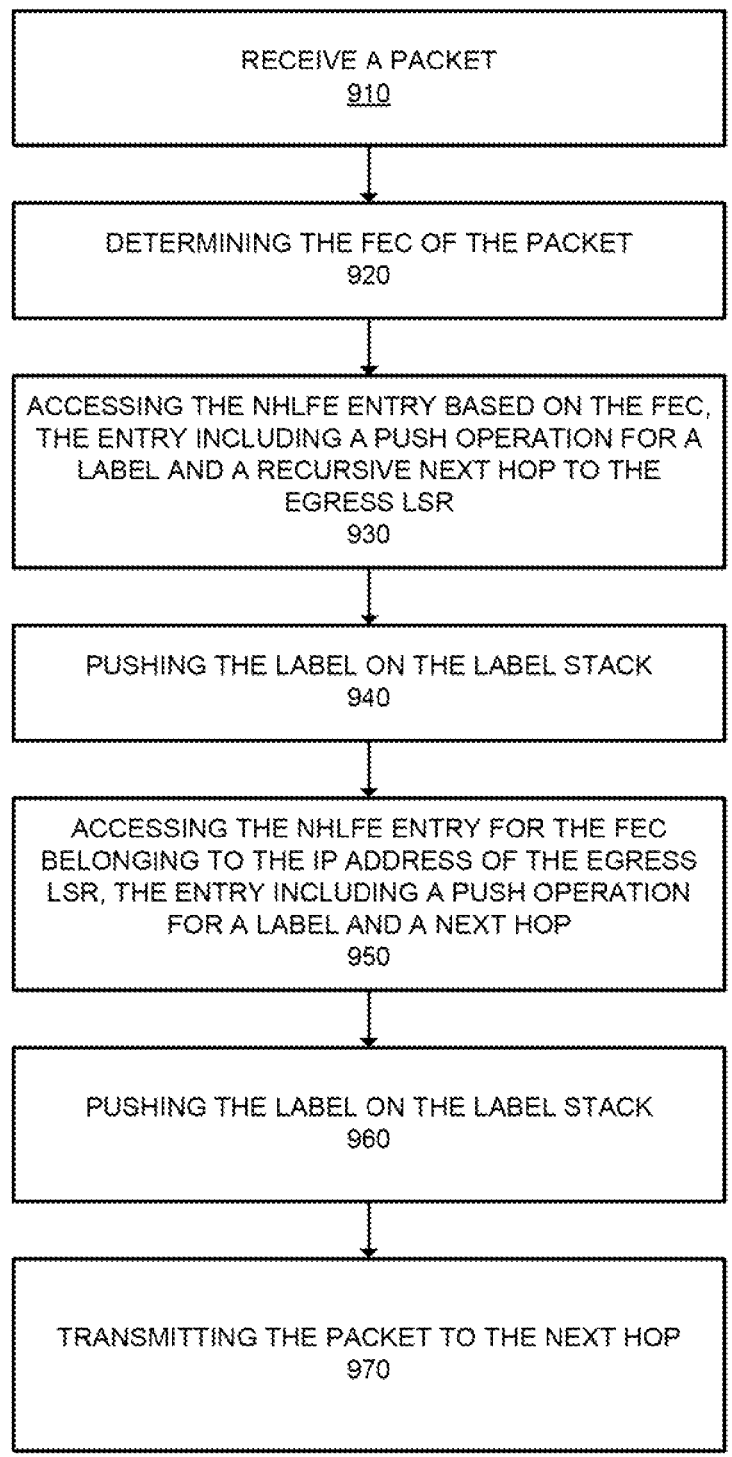
FIG. 9 illustrates exemplary operations performed by an ingress LSR when receiving a packet destined for a remote FEC according to one embodiment.

The end station 160A transmits the packet 810 that includes an IP header (with an IP destination address of the end station 150A) and a data payload. With reference to FIG. 9, at block 910, the ingress LSR 140 receives the packet 810. Flow then moves to block 920 and the ingress LSR 140 determines the FEC of the destination IP address of the packet 810. For example, the ingress LSR 140 includes a set of IP to FEC rules that map destination IP addresses to FECs. The resulting FEC corresponds to the IP address prefix of the end station 150A. Flow then moves to block 930.

At block 930, the ingress LSR 140 accesses the NHLFE that corresponds to the FEC. For example, the FTN structure 162 is first accessed based on the FEC to determine the NHLFE index (pointer) to the NHLFE corresponding to the FEC. In the example of FIG. 1, the NHLFE index corresponding to the FEC IP prefix 1 is 2. The NHLFE corresponding to the determined index 2 is accessed. The NHLFE includes a label, a push action, and a recursive next-hop to the NHLFE for the egress LSR 110. Flow then moves to block 940 and the label 1 is pushed onto the label stack. Flow then moves to block 950.

At block 950, the ingress LSR 140 accesses the NHLFE for the egress LSR 110 (the egress LSR label entry 190) because of the recursive next-hop of the NHLFE for the FEC. In the example of FIG. 1, the egress LSR label entry 190 includes the label 2, a push action, and a next-hop of the LSR 120. Flow then moves to block 960 and the label 2 is pushed onto the label stack. Flow then moves to block 970 and the packet 815 is transmitted to the next-hop LSR 120. As illustrated in FIG. 8, the packet 815 includes the label 2 on the top of the label 1.

The LSR 120 receives the packet 815. Based on the incoming label 2, the LSR 120 determines how to forward the packet. For example, the LSR 120 accesses its ILM entry for the incoming label 2 and determines the corresponding NHLFE which will indicate how the packet is to be processed. In some embodiments the intermediate LSR 120 performs a penultimate hop popping such that it removes the outer most label (the label to reach the egress LSR 110) prior to transmitting the message to the LSR 110. In other embodiments, the intermediate LSR 120 performs a label swap. For example, it swaps the incoming label with the label advertised by the egress LSR 110 (e.g., the NULL label). As illustrated in FIG. 8, the LSR 120 pops the label 2 off of the label stack of the packet prior to transmitting the packet 820 to the egress LSR 110. The egress LSR 110 receives the packet 820 and determines the destination of the packet based on the label 1. For example, the egress LSR 110 examines its ILM entry based on the incoming label 1 and determines that the destination is the end station 150A. The LSR 110 pops off the label 1 and transmits the packet 810 to the end station 150A.

Thus, the labeled packets are transmitted using a hierarchy of LSPs where the LSP of the outer label belongs to the egress LSR and the LSP of the inner label identifies the FEC at the egress of the outer LSP.

Figure 10:
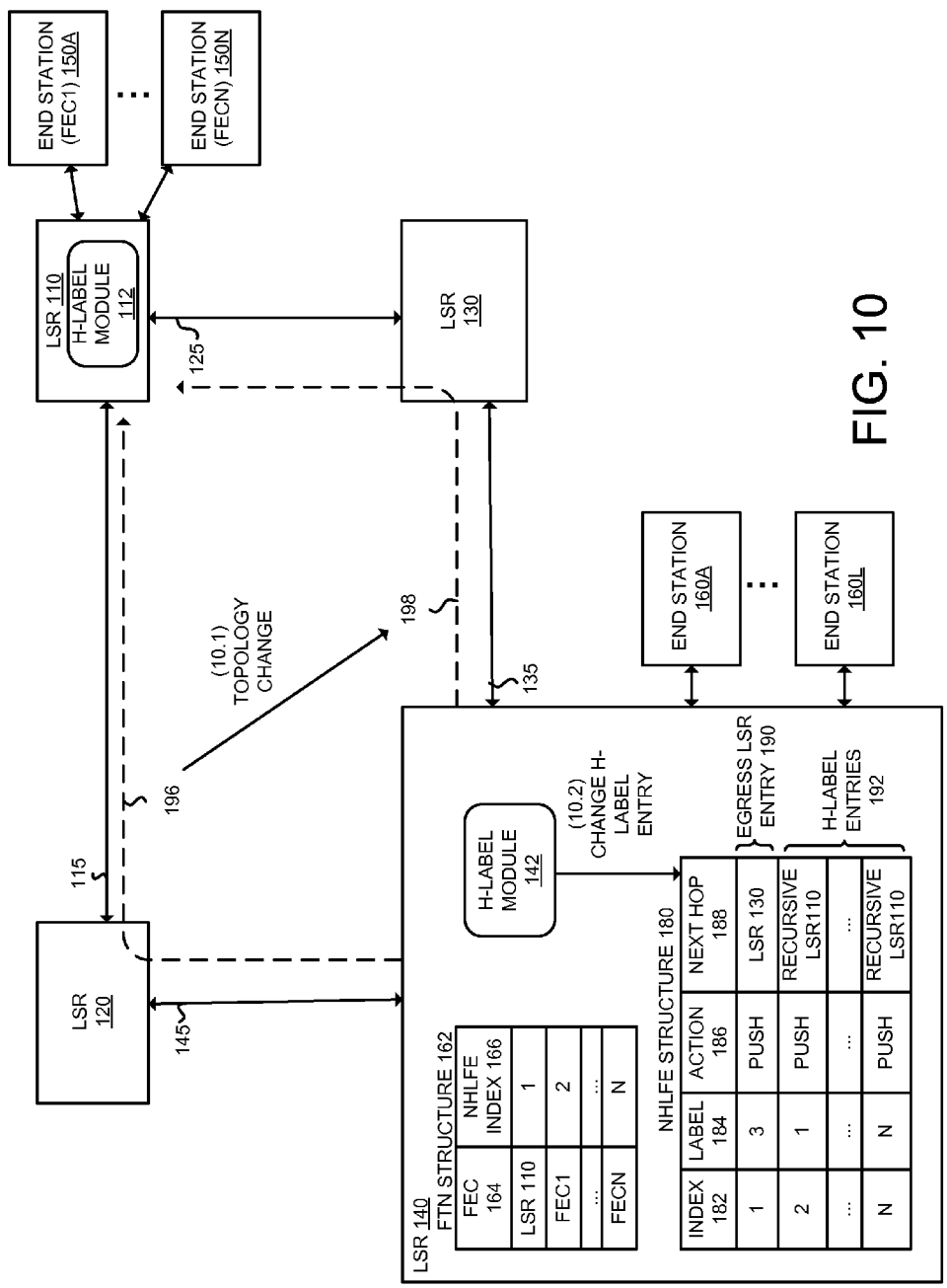
FIG. 10 is a data flow diagram that illustrates exemplary operations performed when a topology change affects the reachability of the egress LSR according to one embodiment.

Responsive to a topology change that affects the reachability of the egress LSR 110 (and hence the reachability of each of the end stations 150A-N), only the egress LSR label entry needs to be modified. FIG. 10 is a data flow diagram that illustrates exemplary operations performed when a topology change affects the reachability of the egress LSR 110. At an operation 10.1, a topology change has occurred that has changed the best path from the path 196 to the path 198. The topology change may occur for a number of reasons including that a link has gone down (e.g., the link 145 and/or the link 115), a change in metric makes the path 198 more optimal, a static route has changed, a node has gone down (e.g., the LSR 120 has gone down), or a new path that is more optimal has been established. In one embodiment, the IGP module notifies the LDP module of the change in topology.

In the example illustrated in FIG. 10, the topology change has changed the next-hop for packets sent from the end stations 160A-L destined to the end stations 150A-N from the LSR 120 to the LSR 130. Since packets are label switched based on the reachability of their egress LSR and not based on the reachability of the destination FECs, only the entry corresponding to the egress LSR needs to be updated. Thus, responsive to the topology change, at operation 10.2, the H-label module 142 changes only the egress LSR label entry 190 to cause the packets to be label switched to the LSR 130 instead of the LSR 120.

Specifically, the H-label module 142 changes the label to label 3 (which was previously advertised by the LSR 130 in the egress LSR label mapping message 134) and the next-hop to the LSR 130. It should be understood that none of the hierarchical label entries 192 need to be changed. Although not illustrated in FIG. 10, in some embodiments the H-Label module 142 changes the entry in its MPLS information base on its control card(s) and downloads only the changed entry to the NHLFE structure 180 which is stored on line card(s) of the LSR 140.

Thus, instead of changing and downloading each of the entries for the FEC IP prefixes (e.g., the entries in the NHLFE structure and possibly the entries in the ILM structure for the FEC IP prefixes) affected by the topology change that affects the reachability of the egress LSR, only the entry for the egress LSR needs to be changed, thereby reducing the convergence time. Therefore, when the path to an egress LSR changes and results in a nexthop change, only the nexthop corresponding to the path to reach the egress LSR needs to be reprogrammed in the data plane. The use of hierarchical labels also reduces the duration of traffic loss during a condition of a link failure or node failure that changes the topology of reaching the egress LSR. For example, consider the case when the link 145 and/or the link 115, or the LSR 120 going down. In a prior art solution that does not use hierarchical label mappings, the traffic restoration is gated by IGP converging (at least in the control plane) followed by the LSR computing and downloading the updated NHLFE entries (and possibly the ILM entries) to the data plane. As the number of IP prefixes increases, the duration for IGP converging (at least in the control plane) as well as the duration for computing and downloading all of the updated entries to the data plane increases. Thus, in a prior art solution that does not use hierarchical label mappings, a link failure or node failure results in increasing traffic loss duration as the number of prefixes/labels in the network increases. In contrast, the use of hierarchical labels allows only the entry for egress LSR to be updated. Thus, using embodiments of the invention, the traffic restoration is gated only by the amount of time for IGP to converge (at least in the control plane) as well as the time for changing and downloading only the updated entry to the data plane.

Figure 11:
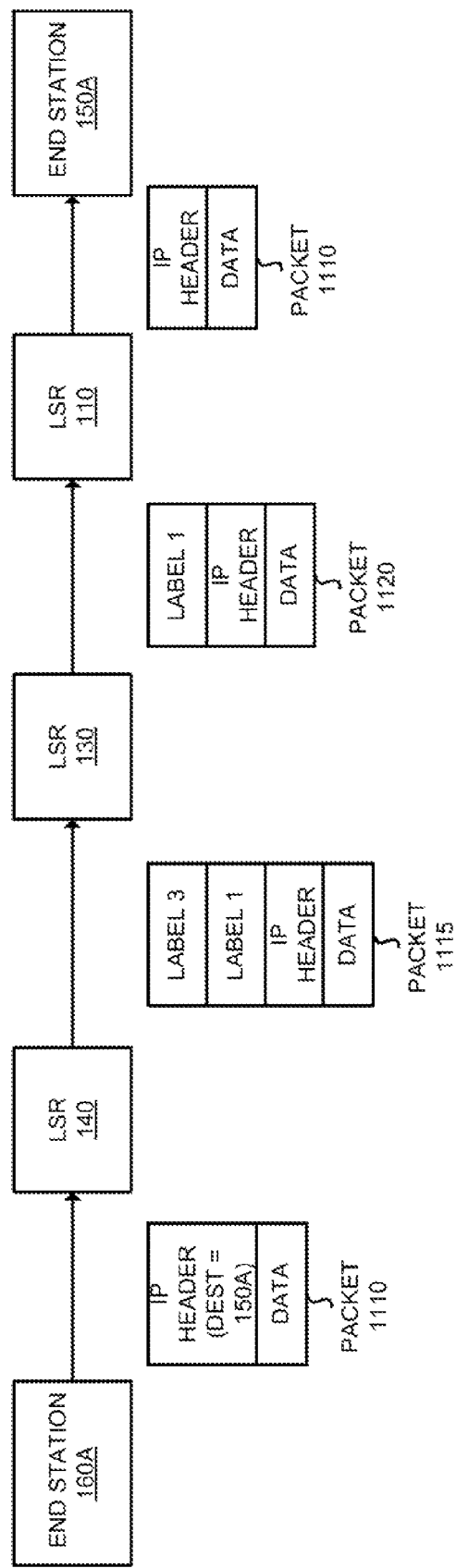
FIG. 11 illustrates an exemplary packet flow using the hierarchy of LSPs after the topology change illustrated in FIG. 10 according to one embodiment.

FIG. 11 illustrates an exemplary packet flow from the end station 160A to the end station 150A using the hierarchy of LSPs after the topology change illustrated in FIG. 10 according to one embodiment. The end station 160A transmits the packet 1110 that includes an IP header (with an IP destination of the end station 150A) and a data payload. The LSR 140 receives the packet and determines the FEC of the destination IP address included in the IP header. Based on the FEC, the corresponding NHLFE is accessed which includes the label 1, a push operation, and a recursive next-hop to the NHLFE of the egress LSR 110. The LSR 140 pushes the label 1 onto the label stack and accesses the NHLFE corresponding to the recursive next-hop. That NHLFE includes the label 3, a push operation, and a next-hop to the LSR 130. The LSR 140 pushes the label 3 onto the label stack and transmits the packet 1115 to the LSR 130.

The LSR 130 receives the packet 1115. Based on the incoming label 3, the LSR 130 determines how to forward the packet. For example, the LSR 130 accesses its ILM entry for the incoming label 3 and determines the corresponding NHLFE. In some embodiments the intermediate LSR 130 performs a penultimate hop popping such that it removes the outer most label (the label to reach the egress LSR 110) prior to transmitting the message to the LSR 110. In other embodiments, the intermediate LSR 130 performs a label swap. For example, it swaps the incoming label with the label advertised by the egress LSR 110 (e.g., the NULL label). As illustrated in FIG. 11, the LSR 130 pops the label 3 off of the label stack of the packet prior to transmitting the packet 1120 to the egress LSR 110. The egress LSR 110 receives the packet 1120 and determines the destination of the packet based on the label 1. For example, the egress LSR 110 examines its ILM entry based on the incoming label 1 and determines that the destination is the end station 150A. The LSR 110 pops off the label 1 and transmits the packet 1110 to the end station 150A.

In some embodiments, the LSRs in a network exchange information to determine whether hierarchical label capability is supported. For example, a hierarchical label capability TLV may be exchanged between the LSRs over LDP that indicates whether hierarchical label capability is supported. In one embodiment, if an LSR along the routed path does not support processing the hierarchical label mappings described herein, the outer LSP proceeds until the furthest downstream LSR that supports hierarchical label processing along the routed path to the egress LSR before the occurrence of an LSR that is incapable of hierarchical label processing. In one embodiment, the outer LSP is a TE (Traffic Engineering) LSP. In one embodiment, if a FEC for which an hierarchical label mapping exists was advertised by an LSR without the hierarchical label mapping (e.g., if the neighbor was not capable of processing hierarchical label mappings), then the ILM entry on that LSR should be installed with a swap operation to the hierarchical LSP, and the hierarchical label mapping should be installed on that LSR in a similar way as an ingress LSR would install that hierarchical label mapping.

In some embodiments, either independent or ordered LSP controls can be used when advertising hierarchical label mappings. For example, an H-label capable LSR may use an independent label distribution control to advertise hierarchical label mappings to its peers at any time it desires. Thus, the LSR can advertise hierarchical label mappings for a FEC with its address if it does not receive hierarchical label mappings (assuming that the LSR does not receive hierarchical mappings from one of the FEC's next-hops).

A hierarchical label capable LSR may also operate using ordered label distribution control. In ordered label distribution control mode, an LSR that receives multiple hierarchical label mappings to a FEC from its neighbors selects the H-label mapping with the lowest cost path to the FEC. The selected hierarchical label mapping for the FEC is advertised to its neighbors (at least those that are hierarchical label capable). The routes corresponding to the FECs do not need to appear in the RIB (or FIB) via IGP before advertising the hierarchical label mapping to the neighboring LSRs.

In some embodiments, LSRs may use a label retention mode such as a conservative label retention mode to maintain a label binding for a FEC learned from a neighbor that is not its next-hop for the FEC. In the conservative label retention mode, if all the paths/next-hops for the FEC have a common shared risk link group (SRLG), then the LSR may have as a backup an alternative next-hop that does not share an SRLG, which may require requesting a label from another label. A common SRLG is a risk shared by two links. By way of example, if multiple fibers are carried through a common duct they share an SRLG in that if the duct is cut, both fibers will also likely be cut.

In some network topologies, the end stations can be multi-homed to multiple egress LSRs. In such a case, each of the egress LSRs advertise a hierarchical label mapping for the FECs associated with those end stations as well as an egress LSR label mapping. When the primary egress LSR becomes unreachable (e.g., that LSR goes down), the ingress LSR changes both the outer LSP to reach the secondary egress LSR as well as the inner LSP. However, since in embodiments of the invention the FECs belonging to the end stations are not advertised in IGP (e.g., only the loopback addresses and the links between the label switched routers are advertised in IGP), the IGP database on the ingress LSR (e.g., the Link State Database (LSDB)) will be relatively small, which will reduce the amount of time necessary for IGP convergence and allow the ingress LSR to switch to the secondary LSR more quickly.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. For example, in the case of a network element including control card(s) and line card(s), each of these cards includes a set of one or more processors (e.g., the line card(s) include a set of one or more packet processing entities (e.g., packet processing ASICs)). The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for improving LDP (Label Distribution Protocol) convergence time in a first network element acting as an LSR (Label Switched Router) in a MPLS (Multi-Protocol Label Switching) network, the method comprising the steps of:
    establishing a hierarchical LSP (Label Switched Path) for a plurality of FECs (Forwarding Equivalence Classes) belonging to a plurality of end stations respectively, wherein the hierarchical LSP for each FEC includes:
        an egress LSR LSP that is common for each of the plurality of FECs and forms a path to a second network element that is acting as an egress LSR for the plurality of FECs and is used when label switching packets in the MPLS network; and
        a unique FEC LSP that is used by the second network element to identify and forward packets to the FEC; and responsive to a topology change that changes a next-hop of the first network element for the egress LSR LSP, of a single forwarding structure containing both at least a forwarding structure entry for the egress LSR LSP and forward structure entries for the FEC LSPs, modifying the forwarding structure entry to change at least the next-hop for the egress LSR LSP without modifying the forwarding structure entries for the FEC LSPs.

2. The method of claim 1, wherein the first network element is acting as an ingress LSR, and wherein the step of establishing the hierarchical LSP further includes the steps of:
    receiving a plurality of label mapping messages from a third network element acting as an intermediate LSR including:
        a first egress LSR label mapping message that indicates a label mapped to an IP address of the second network element, wherein a value of the label is allocated by the third network element, and
        a unique hierarchical label mapping message for each of the plurality of FECs, each of the hierarchical label mapping messages indicating a label originated by the egress LSR mapped to that FEC and also indicating an identity of the egress LSR that originated the label; and
    installing an egress LSR label entry in a forwarding structure based on the first egress LSR label mapping message such that the indicated label will be pushed onto a label stack for outgoing packets destined to any of the plurality of FECs and those packets will be transmitted the third network element; and
    for each unique hierarchical label mapping message, installing a hierarchical label entry in the forwarding structure based on that hierarchical label mapping message such that the indicated label will be pushed onto the label stack for outgoing packets destined to that FEC and that the egress LSR label entry should be accessed.

3. The method of claim 2, further comprising the steps of:
    receiving a plurality of label mapping messages from a fourth network element acting as an intermediate LSR that provides an alternate next-hop to the second network element, the plurality of label mapping messages including:
        a second egress LSR label mapping message that indicates a label mapped to an IP address of the second network element, wherein a value of the label is allocated by the fourth network element, and
        the unique hierarchical label mapping messages for the plurality of FECs;
    wherein the topology change changes the next-hop of the first network element for the egress LSR LSP from the third network element to the fourth network element; and
    wherein the step of modifying the forwarding structure to change at least the next-hop for the egress LSR LSP includes changing the egress LSR label entry in the forwarding structure such that the label allocated by the fourth network element will be pushed onto the outgoing packets destined to any of the plurality of FECs and those packets will be transmitted to the fourth network element.

4. The method of claim 2, further comprising the steps of:
receiving an unlabeled packet destined to a first one of the plurality of end stations;
determining the FEC of the first one of the plurality of end stations based on a destination IP address in the packet;
accessing the hierarchical label entry based on the FEC;
pushing the label indicated in the accessed hierarchical label entry onto a label stack for the packet;
accessing the egress LSR label entry as indicated by the accessed hierarchical label entry;
pushing the label indicated in the accessed egress LSR label entry onto the label stack for the packet; and
transmitting the labeled packet to the next-hop identified in the egress LSR label entry.

5. The method of claim 1, wherein the topology change is one of a link failure, a node failure, a metric change, and a new route with a more optimal path to the second network element.

6. A method in a first network element acting as an egress LSR (Label Switched Router) in an MPLS (Multiprotocol Label Switching) network for originating label mapping messages to establish a hierarchical LSP (Label Switched Path) from a second network element acting as an ingress LSR through a set of one or more third network elements acting as intermediate LSRs to the first network element, the method comprising the steps of:
generating an egress LSR label mapping message that includes a label mapped to an IP address of the first network element;
for each one of a plurality of FECs (Forwarding Equivalence Classes) that belong to a plurality of end stations respectively in which the first network element is an egress, generating a hierarchical label mapping message for that FEC that indicates a label originated by the first network element for that FEC and indicates that the first network element originated that label;
transmitting the egress LSR label mapping message and the hierarchical label mapping messages to one or more peers of the first network element to allow for the establishment of the hierarchical LSP for each of the plurality of FECs that includes an outer LSP that defines a path to reach the first network element and an inner LSP specific to that FEC that is used by the first network element to identify and forward packets to that FEC;
whereby the hierarchical LSP allows for the second network element to react to a topology change that affects reachability to the first network element through changing one or more forwarding entries associated with the outer LSP without modifying forwarding entries associated with the inner LSPs, wherein the forwarding entries associated with the outer LSP and the forwarding entries associated with the inner LSPs are associated with a single forwarding structure of the second network element.

7. The method of claim 6, wherein the label included in the egress LSR label mapping message is a NULL label, and wherein the IP address of the first network element is a loopback IP address of the first network element.

8. The method of claim 6, wherein at least one of the hierarchical label mapping messages is generated in response to receiving a label request message from the second network element.

9. The method of claim 6, wherein the hierarchical label mapping message includes a hierarchical label TLV (type-length-value) that includes:
a generic label sub-TLV that includes the label originated by the first network element for that FEC, and
a FEC sub-TLV that includes the IP address of the first network element.

10. The method of claim 6, wherein at least one of the hierarchical label mapping messages for at least one of the FECs includes a metric type and a metric value for that FEC.

11. A network element acting as an ingress LSR (Label Switched Router) in an MPLS (Multi-Protocol Label Switching) network to transport packets belonging to end stations across the MPLS network using a hierarchical LSP (Label Switched Path), the network element comprising:
a control card including an hierarchical label module that is operative to:
process hierarchical label mapping messages originated from an egress LSR for a plurality of FECs (Forwarding Equivalence Classes) belonging to the end stations that each include a mapping of a label originated by the egress LSR for a FEC and indicates that the egress LSR originated that label, and egress LSR label mapping messages originated from the egress LSR that each include a label mapped to an IP address of the egress LSR, such that a hierarchical LSP is established for each of the plurality of FECs, wherein the hierarchical LSP for each FEC includes:
an egress LSR LSP based on the egress LSR label mapping message that is common for each of the plurality of FECs and provides a next-hop to the egress LSR, and
a unique FEC LSP that carries information to identify and forward packets to the FEC;
download one or more forwarding structure entries representing the hierarchical LSP to one or more line cards of the network element; and
responsive to a topology change that changes the next-hop to the egress LSR, modify and download to the one or more line cards one or more forwarding structure entries for the egress LSR LSP to change the next-hop for the egress LSR without modifying and downloading forwarding structure entries for the FEC LSPs, wherein the forwarding entries for the egress LSR LSP and the forwarding entries for the FEC LSP form a single forwarding structure.

12. The network element of claim 11, wherein the hierarchical label module is further operative to process hierarchical label mapping messages that indicate a metric value associated with the plurality of FECs to determine which hierarchical label mapping message to install when multiple hierarchical label mapping messages are received for a single FEC that are originated by a different egress LSR.

13. The network element of claim 11, wherein the hierarchical label module is to download an egress LSR label entry to a forwarding structure on the one or more line cards based on the received egress LSR label mapping messages that indicates a label to push onto a label stack for reaching the egress LSR.

14. The network element of claim 13, wherein the processing of each of the hierarchical label mapping messages includes the hierarchical label module to download a hierarchical label entry to a forwarding structure on the one or more line cards based on that hierarchical label mapping message such that the indicated label will be pushed onto a label stack for outgoing packets destined to the FEC indicated in the hierarchical label mapping message, and that the egress LSR label entry needs to be accessed to push the label to reach the egress LSR onto the label stack.

15. The network element of claim 14, further comprising:
the one or more line cards including one or more packet processing entities to forward packets destined to the end stations using a hierarchical LSP including, for each received unlabeled packet destined to one of those end stations, performing the following:
determine the FEC of that end station based on a destination IP address of the packet;
access a hierarchical label entry based on that FEC;
push the label indicated in the accessed hierarchical label entry onto a label stack for the packet;
access an egress LSR label entry as indicated by the accessed hierarchical label entry;
push the label indicated in the accessed egress LSR label entry onto the label stack for the packet; and
transmit the labeled packet to a next-hop identified in the accessed egress LSR label entry.

16. A first network element to act as an egress LSR (Label Switched Router) in an MPLS (Multiprotocol Label Switching) network for a plurality of FECs (Forwarding Equivalence Classes) belonging to a plurality of end stations respectively, and to originate label mapping messages to establish a hierarchical LSP (Label Switched Path) from a second network element that acts as an ingress LSR for the FECs through a set of one or more third network elements that act as intermediate LSRs, the first network element comprising:
a control card including an hierarchical label module that is operative to:
generate an egress LSR label mapping message that includes a label mapped to an IP address of the first network element,
for each of the plurality of FECs, generate a hierarchical label mapping message for that FEC that indicates a label originated by the first network element for that FEC and indicates that the first network element originated that label, and
cause a transmission of the generated egress LSR label mapping message and the hierarchical label mapping message to the set of third network elements to be propagated through the MPLS network to allow for an establishment of a hierarchical LSP for each of the FECs that includes an outer LSP that defines a path to reach the IP address of the first network element and an inner LSP specific to that FEC that is used by the first network element to identify and forward packets to that FEC;
whereby the hierarchical LSP allows for the second network element to react to a topology change that affects reachability to the first network element through changing one or more forwarding entries associated with the outer LSP without modifying forwarding entries associated with the inner LSPs, wherein the forwarding entries associated with the outer LSP and the forwarding entries associated with the inner LSPs are associated with a single forwarding structure of the second network element.

17. The network element of claim 16, wherein the label included in the egress LSR label mapping message is a NULL label, and wherein the IP address of the first network element is a loopback IP address of the first network element.

18. The network element of claim 16, wherein the hierarchical label module is operative to generate at least one of the hierarchical label mapping messages in response to receipt of a label request message from the second network element.

19. The network element of claim 16, wherein each hierarchical label mapping message is to include a hierarchical label TLV (type-length-value) that includes:
a generic label sub-TLV that includes the label originated by the first network element for that FEC, and
a FEC sub-TLV that includes the IP address of the first network element.

20. The network element of claim 16, wherein the hierarchical label module is to further include a metric type and metric value for the FECs in the hierarchical label mapping message.

* * * * *